United States Patent
Holloway et al.

[11] 3,913,344
[45] Oct. 21, 1975

[54] FLUID ENERGY MONITORING APPARATUS

[75] Inventors: Thomas M. Holloway, Mukwonago; George J. Janu, Brookfield; Paul W. Kuhar, Meonomonee Falls; Richard N. Laakaniemi, Milwaukee, all of Wis.

[73] Assignee: Johnson Service Company, Milwaukee, Wis.

[22] Filed: Oct. 15, 1974

[21] Appl. No.: 514,640

[52] U.S. Cl. .................. 62/176; 137/816; 236/44; 165/21; 62/208
[51] Int. Cl.² .................................... F25D 17/04
[58] Field of Search ............. 137/816; 62/176, 208; 236/44 A, 44 B, 44 C, 44 R; 165/21

[56] References Cited
UNITED STATES PATENTS

| | | | |
|---|---|---|---|
| 1,751,806 | 3/1930 | Fleisher | 236/44 C |
| 2,144,693 | 1/1939 | Seid | 165/21 |
| 2,225,955 | 12/1940 | Haines | 236/44 B |
| 2,258,021 | 10/1941 | Locke | 165/21 |
| 2,286,604 | 6/1942 | Crawford | 165/21 |
| 2,343,467 | 3/1944 | McGrath | 62/176 |
| 3,388,713 | 6/1968 | Bjornsen | 137/816 |
| 3,758,368 | 9/1973 | Trask | 165/21 |

*Primary Examiner*—William J. Wye
*Attorney, Agent, or Firm*—Andrus, Sceales, Starke & Sawall

[57] ABSTRACT

A fluidic sensing and processing system monitors the enthalpy and/or sensible heat of an outside air and of return air to select the air placing the minimum load on a mechanical refrigeration apparatus. Fluid pressure signals corresponding to the dry-bulb temperature of the air and to the relative humidity of the air are created and summated in a resistor network including individual fluidic summing resistors connected to a common summing point. The summing resistors are directly interrelated with a particular ratio producing a constant output pressure with constant enthalpy but with varying temperatures and humidity. The common psychrometric chart may be employed to indicate the area over which a particular resistance ratio will produce a predictable and reliably significant correlated output pressure. The pair of sensing networks provide output related to the relative enthalpy of the return air and the outdoor air. The output of the networks are connected to a fluidic comparator to establish a selection signal connecting the return air or outside air to the mechanical refrigeration unit. An overriding temperature control comparison is further introduced to provide an overriding control in accordance with the relative outside air temperature with respect to the temperature of the return air from the conditioned zones. If the outside air dew point is below the discharge temperature, air from either source will pass through the mechanical refrigeration without condensation of moisture and selected air should be that with the lowest sensible heat regardless of its enthalpy. The two resistor networks may be applied to a fluidic amplifying device such as a summing impact modulator to produce a proportional output which continuously adjusts the mixture of the two air sources to produce air with a constant enthalpy.

19 Claims, 4 Drawing Figures

FLUID ENERGY MONITORING APPARATUS

BACKGROUND OF THE INVENTION

This invention relates to a fluid energy monitoring apparatus for monitoring the internal energy of a fluid, and particularly to such an apparatus for monitoring the internal energy condition of air employed in pneumatic instruments and systems.

In fluid instruments and systems, the internal energy of the fluid directly affects the system operation and, consequently, a means for monitoring and detecting of such energy is desirable. In particular, in environmental control systems, air may be circulated throughout the environment for cooling, heating and the like. The air may be recirculated through a mechanical heating or cooling apparatus and returned to the environment. The treated air may be also derived from an external source such as the outside atmosphere, with the particular air source being selected to provide the minimum load on the conditioning apparatus. More particularly, in air conditioning systems, a mechanical refrigeration apparatus may be provided with an input selectively connected to a return air duct or to an outside air duct, for treating of either one or a mixture from the two sources. Thus, by selecting the air requiring minimum cooling, a minimum load is placed on the mechanical refrigeration apparatus and thereby produces maximum economy in operation.

Generally the selection of air should be based on the enthalpy and the sensible heat characteristic of the air sources. Further, pneumatic control systems offer many desirable advantages for regulating of the mechanical refrigeration unit in response to demand conditions and the like. Such systems have, however, generally employed electrical signal processing to determine the condition of the respective air streams and have not included fluidic logic systems.

Generally, the electronic processing systems respond to temperature of the respective air and the humidity of the respective air to provide air stream circulation in accordance with the temperature and humidity conditions.

Thus, the particular air stream to be employed will be based not only on the enthalpy, but on the sensible heat characteristic of the air stream which can be determined by proper comparing of the discharge temperature and humidity of the conditioned air and the corresponding characteristic of the air sources.

SUMMARY OF THE PRESENT INVENTION

The present invention is particularly directed to a fluidic sensing and processing system for monitoring the internal energy conditions of a fluid, and particularly the enthalpy and/or sensible heat of the fluid such as air with respect to the output of a fluid conditioning apparatus. The present invention is particularly applicable to pneumatic systems and is hereinafter described with air for purposes of explanation although any fluid can be employed.

Generally, the present invention provides a sensing means for separately detecting the temperature of the air and the humidity of the air and producing fluidic signals in accordance with the respective temperature and humidity. The condition-related signals are applied to a fluid summing means to create an output fluidic signal directly related to the enthalpy and sensible heat of the air. In particular, the dry-bulb temperature and the relative humidity of the air stream are sensed and combined in a special system to form an energy state sensing device. The summated output signal can be readily transmitted for control and/or display and the like. In accordance with a further novel aspect of the invention for selection of a plurality of air sources, separate detection is made and the individual fluidic signals are applied to a fluidic processing circuit means to develop a fluidic output signal dependent upon the relative enthalpy and sensible heat of the several fluid sources with the output, in turn, connected to provide a desired output control signal. The output can be selected to provide a digital output for selection of one source or the other, or through a fluidic amplifying device providing a proportional output action, to mix the sources in order to provide a particular fluid supply with a predetermined energy content. For example, it may be desirable to maintain a constant enthalpy air input to the system.

More particularly, in accordance with the concept of the present invention, the temperature and humidity are suitably sensed, and transduced directly or through a suitable transducer means to a fluid pressure signal corresponding to the dry-bulb temperature of the air and to the relative humidity of the air. A summating resistor network includes a pair of fluidic resistors connected respectively to the temperature signal and to the relative humidity signal. The resistors are connected to a common output to produce a summated pressure signal, which can be directly correlated to the enthalpy value of the air stream.

Applicants have found that the particular summing resistors employed, must be directly interrelated to provide accurate enthalpy determination with the particular ratio being dependent upon the enthalpy range. Thus, the common psychrometric chart which is based on dry-bulb temperature and relative humidity directly indicates the area over which a particular resistance ratio will produce a predictable and reliably significant correlated output pressure. In summary, applicants have found that the output pressure of the summing network will remain constant for selected given resistance ratios and, in effect, with a constant enthalpy line on the chart followed by changes in dry-bulb temperature and/or changes in relative humidity within the boundary of the psychrometric chart. If the boundary is crossed, a new ratio of resistances is required in order to establish a constant output pressure as a constant enthalpy line is followed.

For a proportional control, the two resistor network outputs can be applied to a fluidic amplifying device such as a summing impact modulator or the like. The output of the enthalpy sensing networks are then connected directly to the opposed nozzle means to develop a pair of impacting streams, the relative strength of which provides a corresponding output.

Alternatively, a digital output may be created by connecting the networks to a diaphragm comparator having a dead-ended input chamber connected to one network and an output chamber connected by a fluidic repeater to a source. The second network is connected to the dead-ended input chamber of the fluidic repeater.

In particular, as applied to an environmental control first and second sensing networks provide enthalpy outputs related to the relative enthalpy of two air sources, provided by the return air and by the outdoor air. The outputs are connected to a comparator section having an output coupled to control the selection of the return air and outside air as the supply to a mechanical refrigeration unit.

In accordance with a further feature of the invention, overriding temperature control comparison is introduced to provide a signal at the output chamber of the diaphragm with the comparator. If the outside air dew point is below the discharge temperature, air from either source will pass through the mechanical refrigeration without condensation of moisture. As a result only its sensible heat will be affected by the refrigeration unit. As a result the air stream to be selected is that with the lowest sensible heat regardless of its total internal or latent content. This is conveniently provided by employing a pair of diaphragm amplifier devices connected as temperature comparators with the outdoor amplifier modulating the supply of pressure to the return line. If the dew point of the outside air is above the discharge temperature, the logic system will select the air based on the relative enthalpy of the two airs. If, however, the dew point of the outside air is below the discharge temperature, the temperature comparing section will override that of the enthalpy section and the selection of air sources will be made on the basis of temperature.

Thus, within the broadest aspects of the present invention, various other overriding control means can be operated into the basic control to provide the desired air action between the operating system to provide optimum response to the overall conditions.

The present invention thus provides a highly improved means for controlling of fluid systems particularly in environmental controls employing pneumatic processing.

BRIEF DESCRIPTION OF THE DRAWINGS

The drawings furnished herewith illustrate the best mode presently contemplated for carrying out the invention and clearly disclose the above advantages and features as well as others which will be readily understood from the description of such illustrated embodiment.

In the drawings.

DESCRIPTION OF THE ILLUSTRATED EMBODIMENT

Figure 1:
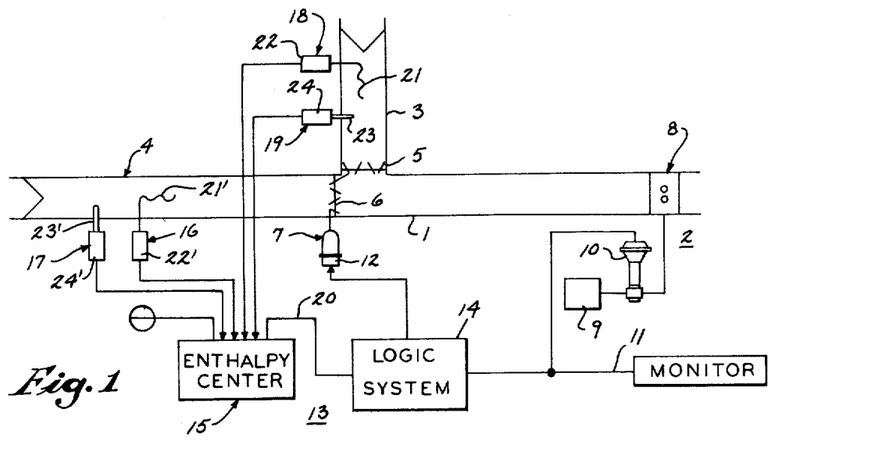
FIG. 1 is a simplified block diagram of an environmental control system for supplying of cooling air to an environment.

Referring to the drawings and particularly to FIG. 1, a typical air cooling system is illustrated for supplying of air at a predetermined temperature via a load supply duct 1. A mechanical refrigeration unit 2 is coupled to the discharge side of the duct 1 and selectively draws air from a return air supply duct 3 and an outside air supply duct 4. In the illustrated embodiment of the invention, the ducts 3 and 4 are diagrammatically illustrated mounted in perpendicular relationship to each other with an individual return air damper 5 and an outside air damper 6 mounted immediately adjacent to such junction. A common actuator 7, preferably of a pneumatic type, is coupled to the dampers 5 and 6 to selectively supply either return air or outside air to the mechanical refrigeration system 2, in such a manner as to provide optimum economical operation of the system.

Generally, the illustrated mechanical refrigeration system shown including a cooling coil unit 8 mounted within the load supplying duct 1 and connected to a suitable compressor unit 9 via a modulating valve 10. The cooling coil unit 8 is adapted to be operated, for example, to maintain the load air at 55° F. and at or approaching 100% humidity. The air is supplied to the cooling coil unit 8 from either of the two supply ducts 3 or 4 and treated to reduce its temperature to 55° F. and to increase its humidity toward 100% and delivered to one or more areas or zones to be cooled. A demand signal source 11 monitors the condition of the zone air in accordance with any known or desired manner and develops a control signal which is fed back to actuate the mechanical refrigeration system valve 10 and simultaneously to supply an interrelated control signal to a pneumatic input element 12 for the actuator 7 via a logic selection unit 13 such that actuator 7 provides the desired selection by closing of one and opening of the other of dampers 5 and 6.

The logic selection unit 13 generally includes a logic comparator or system 14 which responds to the sensed demand signal of source 11 and the output of an air enthalpy logic unit or center 15 to provide for optimum operation. The enthalpy logic center 15 is constructed to provide an output in accordance with the enthalpy and temperature of the return air as compared with the enthalpy of the outside air, generally as follows.

An outside air temperature sensor 16 and an outside air humidity sensor 17 are connected to the inlet end of the outside air supply duct 4. Similarly, a return air temperature sensor 18 and a return air humidity sensor 19 are mounted within the inlet end of the return air supply duct 3. The several sensing units 16 through 19 are connected to logic center 15 which compares the inputs in a unique manner to generate an output signal related to the enthalpy and sensible heat of the return air and/or the outside air at an output signal line 20 which is coupled to the logic system 14 for further comparison and operation of the actuator 7 in accordance with and in response to the demand signal.

The logic selection section 13 should desirably provide outside air or return air to provide the most economical loading of the refrigeration system.

Although the sensors 16 through 19 may be of any suitable construction, including any one of a great variety of electronic-mechanical or direct fluid responsive devices commercially available, they generally are shown including a sensing element and a transducer transmitter to generate a suitable pneumatic signal. Typical sensors manufactured and sold by Johnhson Service Company of Milwaukee, Wisconsin include a temperature sensor Model T-5210 and a humidity sensor Model H-5210.

Referring to the return air system, the illustrated temperature sensor 18 includes a sensing element 21 mounted within the return air duct 3. The element 21 is coupled to a transmitter 22 to transmit a pneumatic pressure signal directly proportional and related to the temperature of the return air. The humidity sensor 19 similarly includes a sensing element 23 located within the return air duct 3 and connected to control a similar fluid pressure signal transducer-transmitter 24 which provides an air pressure signal via its connecting line to the enthalpy logic center 15.

The outside air sensors 16 and 17 are similarly constructed and defined by corresponding primed numbers for simplicity of illustration.

Figure 2:
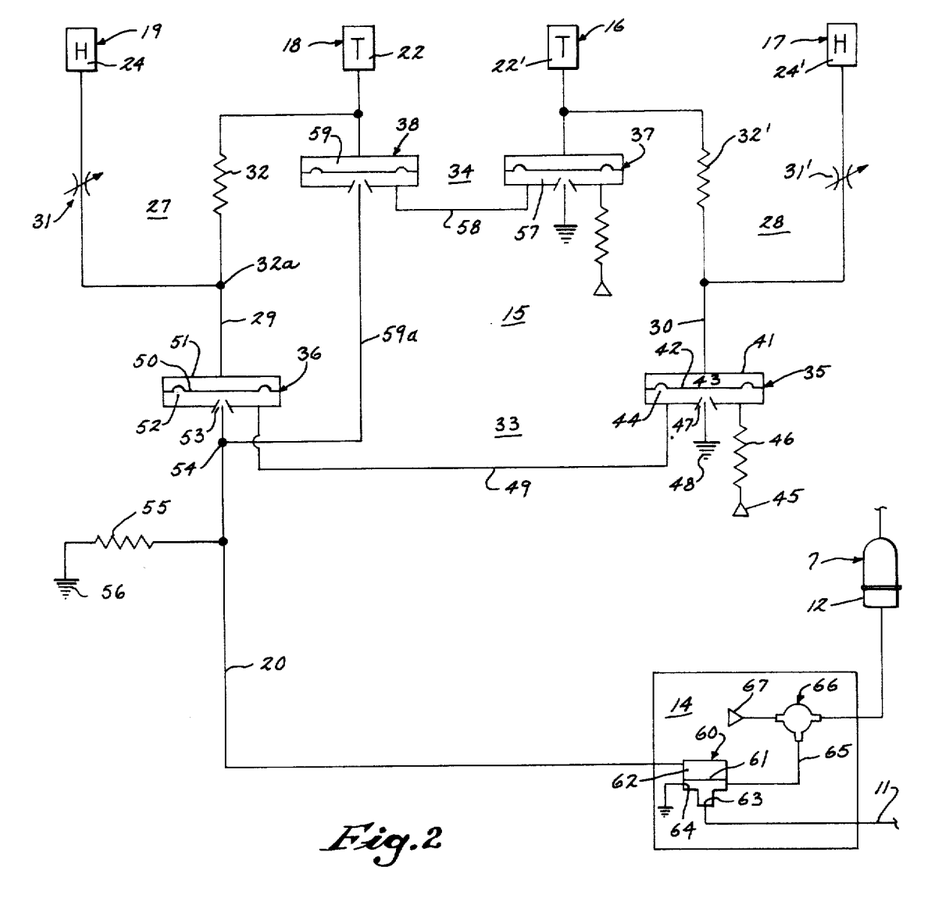
FIG. 2 is a schematic circuit of a fluid logic center constructed in accordance with the present invention for use in the system of FIG. 1.

The several pressure signals directly provide information regarding the energy content of the respective air supplies and by combining and processing of the respective signals, the proper air stream can be selected to impose the lowest load on the mechanical refrigeration unit 8. Referring particularly to FIG. 2, a schematic illustration of the logic center 15 interconnected to the logic system 14 in accordance with the preferred embodiment of the present invention is shown.

The enthalpy logic center 15 for generating of an enthalpy control signal at the signal line 20 includes a pair of similar enthalpy signal generating networks 27 and 28 coupled to the respective sensors 16–19, inclusive. Network 27 develops a pressure signal at a return air enthalpy line 29 and network 28 similarly develops an outside air enthalpy signal line 30. As each of the networks is similarly constructed, the return enthalpy sensing network 27 is described in detail with the corresponding elements of the network 28 identified by similar primed numbers.

More particularly, the enthalpy return air network 27 includes a variable restrictor 31 operating at a generally linear pressure flow point such as an adjustable orifice connected to the output of the transmitter 24 to produce a proportional pressure signal directly related to the humidity. A fixed linear resistor or restrictor 32 is connected between the temperature-transmitter 24 and the output side of the restrictor 31 at a common node or connection to line 29. The variable orifice or restrictor 31 and the fixed restrictor 32 are thus connected to the common summing point 32a to generate a related output signal at the return air enthalpy signal line 29. The network 27 is designed to produce accurate and linear related signals. The restrictor 31 permits adjustment of the network to compensate for manufacturing tolerances of the resistor 32 and the like.

The outside air network similarly includes a variable restrictor 31' and fixed resistor 32' interconnected to generate a corresponding enthalpy output related pressure signal at the outside air pressure signal line 30. The output pressure is defined by the following equation:

$$P_o = K \left[ \frac{R_2}{R_1} P_{DB} + P_{RH} \right]$$

Where $P_o$ is equal to the output pressure in pounds per square inch gauge (psig):

K is equal to a constant which is less than 1;

$R_2$ equals the resistance of resistor 31;

$R_1$ equals resistance of the temperature resistor 32;

$P_{DB}$ is equal to the dry-bulb temperature intput pressure in psig; and $P_{RH}$ is equal to the relative humidity input pressure in psig.

Figure 3:
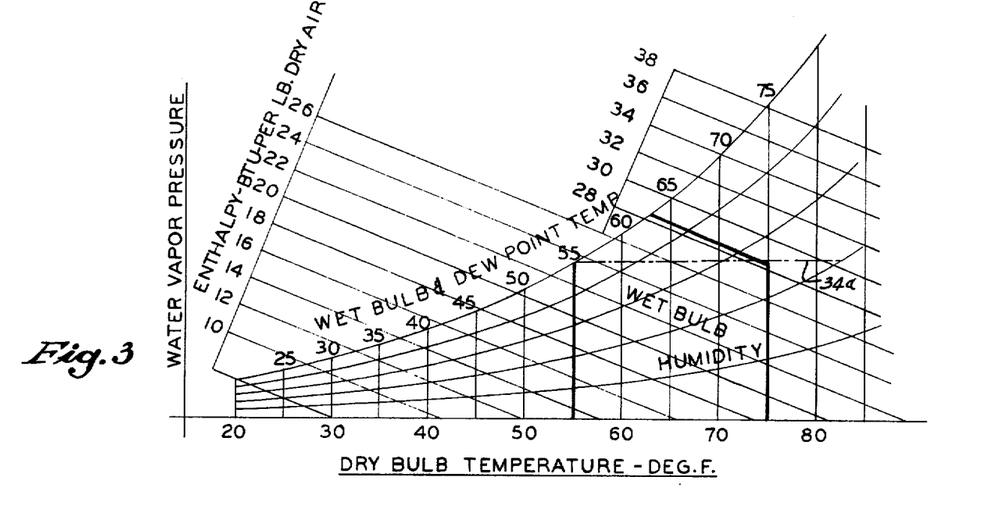
FIG. 3 is a simplified illustration of a psychrometric chart illustrating the operation of the system shown in FIG. 2.

Applicants have found that over a limited ratio of the resistances of resistors 31 and 32, the output pressure will be a constant over a limited extent of the constant enthalpy lines of a psychrometric chart such as shown in FIG. 3. Thus, within certain boundaries of operation which can be readily determined, there is a direct correlation between the output pressure signal appearing at the output signal lines 29 and 30 and the actual enthalpy of the corresponding air.

The two output signal lines 29 and 30 are therefore combined in an enthalpy comparator section 33 to generate an output signal at the logic center output line 20 in accordance with the relative enthalpy of the two air sources 3 and 4 under certain temperature conditions. A temperature comparator section 34 is connected to the temperature transmitters 22 and 22' to override the enthalpy condition and generate a temperature related selection under certain temperature conditions.

Referring particularly to FIG. 3, the illustrated psypsychrometric chart covers the lower range of temperatures to approximately 80° dry-bulb temperatures. With the dry-bulb temperature located on the X-axis and the water vapor pressures and the water vapor content per pound of dry air on the Y-axis. The total heat content in btu per pound dry air are provided along with the wet bulb temperature line and the dew point line. The output treated air is typically at 55° F. and at or close to 100% relative humidity and the return air is at 75° F. and 50% humidity, the load imposed on the coil unit 8 with the outside air having a dew point above 55° F. as the source would be the enthalpy difference between the outside air condition and the 55° F., 100% relative humidity point on the chart.

If the outside air dew point is below 55° F., moisture will not be condensed from the outside air passing through the cooling coil unit 8 and only the sensible heat of the air stream will be affected. Similarly, there is essentially no latent cooling of returned air. Consequently, only the sensible heat characteristic of the air stream is of significance.

As a result, accurate determination of the most economic cooling load is directly related to the lowest sensible heat of the two air streams regardless of the latent content thereof. The sensible heat is, of course, directly related only to the temperature of the two air streams. If the outside air dew point is below 55° F., outside air will be selected if its temperature is below the return air. If the outside air dew point is above 55° F., the outside air is selected as the source only if its enthalpy is less than that of the return air and its temperature is less than the return air. Otherwise the maximum amount of return air is employed.

This is diagrammatically illustrated in the chart by the heavy line from the 75° and 50% humidity point to the base or abscissa along the 75° F. line and to the dew point along the 28.6 BTU/No. M enthalpy line. These temperature and enthalpy lines are defined by the following logic equation where RA and OA refer, respectively, to the return air and the outside air and h refers to enthalpy.

| Conditions | Enthalpy Logic center Output $P_o$ | HVAC System Response | |
|---|---|---|---|
| | | Minimum | Maximum |
| If $h_{RA} > h_{OA}$ and $T_{RA} > T_{OA}$ | Minimum | RA | OA |
| If $h_{RA} < h_{OA}$ or $T_{RA} < T_{OA}$ | Maximum | OA | RA |

The selected operation points are typical of those encountered in heating, ventilating and air cooling systems for buildings and the like. As shown in FIG. 3, a vapor pressure line through the treated air point, as shown by phantom line 34a, essentially also passes through the typical return air point. Therefore, if the air supplied to the mechanical refrigeration unit 8 is above this line, both latent and sensible heat is extracted to reduce the air to 55° F. and 100% relative humidity. If the air is below such line, no moisture is condensed and only the sensible heat is effected, and the humidity of the treated air might then be less than 100% relative humidity. The comparison is thus made about the return air point and the previous equation operates reliably about such point with a proper ratio of resistance. Thus, over a small range the humidity lines are reasonably linear and parallel and the equation provides a practical linear definition of a non-linear relationship. In the practical application being discussed, Applicants employed resistors 31 and 32 with a resistance ratio of 3.64 which produced a predictable output pressure within the enthalpy boundaries of 24.48 btu per pound of dry air to 32.42 btu per pound of dry air, and temperature boundaries of 57° F. and 78° F.

The output pressure remains constant as long as the constant enthalpy line on a psychrometric chart is followed, and dry-bulb temperatures at comparison stay with the boundaries defined above. Movement over such boundary requires a change in the heating, ventilating and air conditioning resistance ratio to maintain a predictable output constant pressure. However, in such systems it is seldom necessary to operate outside the above range because the return air conditions are seldom outside of this range.

More particularly, the output of the enthalpy networks 27 and 28 are connected to the output comparator section 33 which includes an outside air signal repeater 35 and a signal comparator 36 interconnected respectively to the network signal lines 30 and 29 to produce an output pressure signal at the output signal line 20 in accordance with the relative enthalpy of the two streams. Summated with the output of the enthalpy is the output of a temperature comparator section 34 which includes an outside air repeater unit 37 and a temperature comparator unit 38, the output of which is connected and summed with the output of the enthalpy section 33 at the summing point 54. A ground reference resistor 55 and output line 20 are connected to the summing point 54. Generally, the several pressure repeater units 35 and 37 and the comparator units 36 and 38 are similar diaphragm controlled, leak port devices such as disclosed in U.S. Pat. No. 3,662,779 which issued May 16, 1972 to Weber et al. Referring to unit 35 for descriptive purposes, the repeater includes a housing 41 having a convoluted diaphragm 42 defining an input signal chamber 43 connected to the enthalpy signal line 30 of the outside air network 28. An output chamber 44 is defined to the opposite side of the diaphragm 42 and includes a pneumatic supply connection port to a suitable pneumatic air supply 45 in series with a supply resistor 46. The output chamber 44 is coupled by an orifice 47 to atmosphere or other suitable reference 48. Thus the pressure within the output chamber 44 equals the pressure in the signal chamber 43, with the diaphragm 42 moving to modulate the leakage to reference via orifices 47 until such time as the pressures are equal. A coupling or signal pressure transfer line 49 connects the output pressure chamber 44 to the comparator unit 36 where its pressure is compared with the pressure of the return air enthalpy signal at line 29.

The comparator unit 36 is thus a similar fluidic diaphragm comparator with a diaphragm 50 defining an input chamber 51 and an output chamber 52. The input chamber 51 is connected directly to the return air enthalpy signal line 29 from the enthalpy sensing network 27 for the return air. The output chamber 52 has one input connected to the transfer line 49 and an orifice 53 connected to a load signal summing point 54 and via line 20 to the logic system unit 14. A load resistor 55 connects the output signal line to ground or reference 56. In operation, the comparator has the return air enthalpy signal 29 applied to the input chamber 51 and the outside air enthalpy signal applied to the output chamber 52. The diaphragm 50 is positioned relative to the orifice 53 in accordance with these two pressure signals. Consequently, the pressure signal appearing at the output line will be directly controlled by the relative pressure levels.

The output or load resistor 55 provides a continuous bleed for any trapped pressure which might arise if the output circuit includes a dead-ended operator. The resistance of the output resistor 55 is significantly greater than that of the load or supply resistor 46 in order to ensure a switching logic action particularly when the outside air enthalpy is greater than the return air enthalpy. Therefore, when the outside air enthalpy pressure from line 49 is transmitted to line 20 load resistor 55 does not significantly reduce its level compared to an infinite resistance. However, when line 49 is rotated from line 20 by comparator 36, the pressure in line 20 bleeds off through load resistor 55. In accordance with the illustrated construction of the comparator 36, a digital output is thus derived. If the return air enthalpy signal at line 29 is above that of the outside air at line 49, the diaphragm 50 moves to completely close the orifice thereby establishing a zero pressure output or logic 0 signal. Conversely, if the enthalpy of the outdoor air is greater than that of the return air, the diaphragm 50 is positioned away from the orifice 53 and the pressure of the outdoor air enthalpy at line 49 is transmitted to the output signal line 20 to create a logic 1 output.

In addition to the above enthalpy comparison, the temperature section 34 provides a similar temperature comparison with the outputs summed at the summing point 54 to introduce the effect of return-outside air temperatures for optimum selection of the air source.

The illustrated temperature section 34 includes a fluidic repeater 37 similar to repeater 35 for detecting and providing a pressure output signal related to the outdoor air temperature. The repeater 37 thus includes an output chamber 57 connected directly to the output of the outdoor air temperature pressure transducer 22' of transmitter 16 and to a transfer signal line 58. A fluid diaphragm comparator 38, similar to the enthalpy comparator 36, has an output chamber connected to line 58 and an input chamber 59 connected directly to the return air temperature transmitter 22 of sensor 18 to produce a corresponding pressure signal at the orifice-coupled output line 59a which is connected to summing point 54. If the temperature of the outside air is above that of the return air, a positive pressure or logic 1 signal is produced via output line 59a the summing point 54. If, however, the return air is at a greater temperature, the comparator is shut-down and a logic 0 signal is supplied via output signal line 59a and the enthalpy section controls. The enthalpy section load resistor 55 also bleeds down line 59a when the return air tenperature becomes greater than the outside air temperature.

In summary, the controlling signal at the signal line 20 from the logic center 15 to the logic system 14 is a positive pressure or logic 1 signal if the outdoor enthalpy or the outdoor air temperature is above that of the corresponding characteristic of the return air. The output signal is a low pressure or a logic 0 signal only if both of the opposite conditions occur, that is, if the outside air temperature and enthalpy are less than those of the return air.

This, of course, exactly corresponds to the desired characteristic as set forth in the previous logic table summarizing the optimum selection of the outside and return air source.

The illustrated logic system 14 is shown for purposes of illustration as including a diaphragm valve unit 60 of a well-known construction. Generally the valve unit 60 includes a diaphragm 61 defining an input chamber 62 connected to the output pressure signal line 20 from the logic center 15. The valve unit 60 includes a normally open input valve port 63 connected to the demand signal line 11 and a normally closed input port 64 connected to reference or ground. The demand signal is selectively fed through the air valve unit 60 to an output signal line 65 which is connected to a minimum pressure cummulator 66 and then to the input element 12 of actuator 7. This minimum pressure cummulator sets a minimum on pressure to 12 thereby maintaining required code ventilation. The actuator 7 will produce minimum outdoor air as set by minimum pressure cummulator 66 with maximum return air circulation under normal conditions and permit greater outside air flow only in the presence of logic 0 from the signal from the logic system 15. If the return air enthalpy is greater than the outside air enthalpy and the temperature of the return air is simultaneously greater than the outside air, the output of the logic center 15 drops to a low pressure and a logic 0 signal is applied to valve unit 60 which resets. The incoming demand signal is transmitted as a positive pressure via the valve unit to modulate actuator 7, which operates the return air duct damper 5 and the outside air duct 6 in a complementary fashion. The system now supplies outside air as needed to supply cooling to the conditional space. This condition is maintained until the outside air enthalpy or temperature becomes greater than that of the return air. If either one should reverse, the output of the logic center 15 immediately rises to a logic 1 level, providing a logic pressure to the valve unit 60 to close the demand signal valve and open the normally closed reference valve connection, thereby removing the signal pressure from the minimum pressure cummulator 66. The actuator 7 returns to its minimum and thereby closes the outside air duct to minimum ventilation and opens the return air duct to supply return air.

Summarizing the operation of the illustrated sensing and processing system as shown in FIG. 2, the sensing networks 27 and 28 continuously monitor the enthalpy of the outdoor air and the return air and produce enthalpy correlated pressure signals. The pressure signals are applied to the output section with the fluid repeater isolating the outdoor air network and the comparator producing a corresponding logic 1 or logic 0 signal in accordance with the relative enthalpy. Similarly, the temperature section produces a corresponding logic output summed with that of the enthalpy section at the summing point 54. The output signal so generated is now applied to the logic system 14 which may be of any suitable construction designed to respond to the demand signal and simultaneously to the output of the logic center 15 to provide optimum operation of the flow system.

The three-way valve unit 60, therefore, passes an outside air demand signal to the cumulator and actuator 7 in a normally open mode whenever the outside air is more economically employed as a result of the logic center output producing a logic 0 signal.

If the return air is more economically employed, a logic 1 is received from the logic center, closing the valve unit 60. The demand signal is now blocked and the output cumulator is vented such that the actuator is positioned to the minimum percentage of outdoor air flow.

The present invention thus provides a fluid device for determining the enthalpy and/or sensible heat characteristics of various fluid sources and is particularly adapted to pneumatic temperature and humidity sensors and transmitters in outdoor-air and return-air environmental controls. The transmitters can be conventional, readily available, separate, dry temperature transmitters and relative humidity transmitters which are widely employed for pneumatic transmission in environmental control systems. Where the selection, for example, is based only on the enthalpy of the two sources, the temperature section can, of course, be eliminated and the output pressure will then be directly controlled by the relative enthalpy of the two sources. Further, any plurality of sources can be employed through the use of appropriate comparing and combining networks. The return-air and outdoor-air selection system is illustrated in view of the significant practical application in connection with environmental control systems.

The output pressure signal generated is readily transmitted to pneumatic display and/or pneumatic control and, as illustrated in the embodiment of FIG. 2, may provide a direct digital type control for maximizing of the economical operation of a control system.

However, the present invention can be readily and equally applied to a proportional type control.

Figure 4:
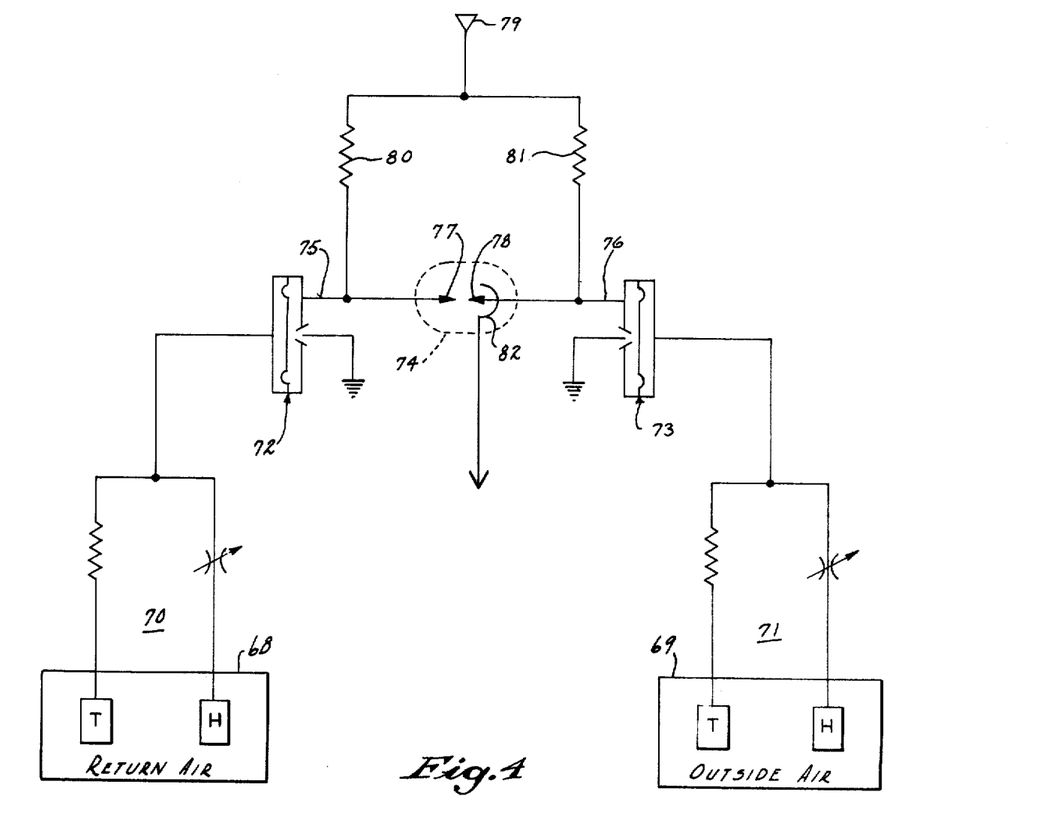
FIG. 4 is a schematic view of a sensing network providing a modulated output in accordance with this invention.

Referring particularly to FIG. 4, an embodiment of the present invention is shown for producing a proportional output signal in accordance with the relative enthalpy of a pair of sources 68 and 69, once again, diagrammatically referred to as a return-air source and an outdoor-air source similar to that previously described. Enthalpy sensing and combining networks 70 and 71 are constructed in accordance with the previous networks and no further description thereof is given. Enthalpy networks 70 and 71 are similarly connected through a pair of fluidic repeaters 72 and 73, so as not to load the networks, to a fluidic amplifier 74, the output of which is a signal directly related and proportional to the difference between the enthalpy output signals.

The fluidic repeaters 72 and 73 are essentially similar to those previously described and no further description is given.

The individual output or enthalpy signal lines 75 and 76 from the fluid repeater are connected as the inputs to the fluidic amplifier 74.

The illustrated fluidic amplifier 74 is a summing impact modulator similar to that disclosed in U.S. Pat. No. 3,388,713 which issued June 18, 1968 to B. G. Bjornsen. Generally, the impact modulator includes a pair of opposed nozzles 77 and 78 located in opposed relation and respectively connected to the enthalpy signal lines 75 and 76 as well as a bias supply 79 via suitable resistors 80 and 81. The opposed nozzles 77 and 78 define impacting streams, not shown, with the impact position located with respect to a collector chamber 82 adjacent the one nozzle. The strength of the two streams is directly related to and proportional to the enthalpy pressure signals at lines 75 and 76 and the output pressure at the collector 82 is proportional to the difference between such signals. Consequently, the output is a proportional pressure signal which may, for example, be applied to a pneumatic operator such as previously described to modulate the position of the dampers and thereby produce either a mixing of air from the outside air source and the return air source or from only one of such sources in proportion to the relative enthalpies.

In the illustrated embodiment of the invention, if the enthalpy of the outside air 69 is less than the enthalpy of the return air 68, the output pressure level goes to the level of the outside air enthalpy signal as applied to line 76. If the level of the outside air enthalpy pressure signal increases or is greater than that of the return air enthalpy signal, the output pressure goes toward zero.

In this embodiment, as in the previous embodiment, a reverse acting circuit is readily obtained by merely reversing of the enthalpy pressure signals to the comparing device.

A proportional type system with the proportional mixing of the outdoor air and return air would, of course, be employed wherever a constant enthalpy air stream is desired.

The dual sensing network interconnected to provide an interrelated comparator control is shown for purposes of illustrating a unique novel application of the basic enthalpy fluidic detection system and to more clearly illustrate the practical application of the present invention. Within the broadest aspects of the invention a single sensing network can, of course, be employed to provide a fluid enthalpy signal for indicating the enthalpy or providing a system control.

Various modes of carrying out the invention are contemplated as being within the scope of the following claims, particularly pointing out and distinctly claiming the subject matter which is regarded as the invention.

We claim:

1. A heat content monitoring apparatus for generating a fluid signal in accordance with the heat content of a fluid, comprising sensing means to detect the temperature of the fluid and to generate a fluid signal having a strength level proportional to said temperature, sensing means to detect the humidity of the fluid and to generate a fluid signal having a strength level proportional to the humidity of the fluid, a resistance summing network having separate resistance branches coupled to the respective sensing means and connected to a fluid signal summing means to produce an enthalpy fluid signal related to the individual strength levels and the relative resistance in the branches of the summing network, said summing network generating an essentially constant enthalpy fluid signal over a predetermined enthalpy range of the fluid, said range being directly related to the ratio of the resistance of said resistance branches.

2. The heat content monitoring apparatus of claim 1 wherein said sensing means to detect the temperature and said sensing means to detect the humidity establish pressure signals.

3. The heat content monitoring apparatus of claim 1 wherein at least one of said separate resistance branches includes an adjustable resistor for adjustment of the ratio of the resistance of said resistance branches.

4. In a fluid control system for controlling the supply of fluid to a load from a first fluid source and from a second fluid source comprising temperature detecting means for detecting the dry-bulb temperatures of the first and second sources and establishing related fluid temperature signals, humidity detecting means for detecting the humidity of the first and second fluid sources and establishing related fluid signals, first combining means to combine the humidity and temperature signals related to the first source to generate a corresponding first source enthalpy signal, second combining means for combining the temperature and humidity signals related to the second source to generate a corresponding second source enthalpy signal, and an enthalpy comparator section connected to the first and second combining means to produce a control signal in accordance with said two enthalpy signals.

5. The control system of claim 4 wherein each of said combining means includes a pair of resistor branches connected between a common summing point and each of the detecting means, said summing point generating an essentially constant enthalpy fluid signal over a predetermined enthalpy range of the fluid, said range being directly related to the ratio of the resistance of said resistor branches.

6. The control system of claim 5 wherein said enthalpy comparator section includes a fluidic repeater connected to the first combining means to generate a corresponding isolated fluid signal, a fluidic pressure comparator having a pair of inputs connected respectively to the fluidic repeater and to the second combining means.

7. The fluid control system of claim 6 including a temperature comparator section connected to the temperature detecting means to develop an output related to the relative temperatures of the first and second sources, said temperature comparing section including a first temperature fluidic repeater connected to the temperature detecting means and generating a first temperature related output signal, a fluidic pressure comparator having one input connected to the output of the temperature fluidic repeater and a second input connected to temperature detecting means to receive the second temperature signal and generating a pressure output signal related to pressures of the temperature signals, a summing means summing the output of the enthalpy comparator section and the temperature comparison section to generate a predetermined logic output directly related to the enthalpy and the temperature conditions of said first and second sources.

8. The fluid control system of claim 4 including a temperature comparator section connected to the temperature detecting means to develop an output related to the relative temperatures of the first and second sources, and means connecting the temperature comparator section to the enthalpy comparator section to effectively disable the enthalpy comparator section in response to a selected temperature comparison and produce said control signal in accordance with said temperature comparison.

9. The fluid control system of claim 4 wherein said fluid sources include a return-air source and an outside-air source, said temperature detecting means including a first temperature detector for detecting the temperature of the one fluid source and a second temperature detector for detecting the temperature of the second fluid source, each detector establishing a related fluid signal, said humidity detecting means including a first humidity detector for detecting the humidity of the first fluid source and a second humidity detector for detecting the humidity of the second fluid source, said first combining means including a temperature resistor connected to the first temperature detector and a summing point and a humidity resistor connected to the first humidity detector and to said summing point, second combining means including a temperature resistor connected to the second temperature detector and to a second summing point and a humidity resistor connected to the second humidity detector and said second point.

10. The fluid control system of claim 9 wherein said comparator includes a fluidic amplifier having first and second input means and an output means establishing an output signal proportional to the difference of said inputs, first and second fluid repeaters connected between said first and second summing points and said first and second input means.

11. The fluid control system of claim 10 wherein said amplifier is a summing impact modulator having a pair of opposed nozzles connected one each to repeaters, a bias supply connected to the nozzles.

12. The fluid control system of claim 9 wherein said enthalpy comparator section includes a fluidic repeater coupled to the one summing point to generate a related fluid signal and an output section including a fluid pressure comparator having a pair of inputs connected respectively to the fluidic repeater and to the second summing point.

13. The fluid control system of claim 12 wherein said fluidic repeater and said pressure comparator are diaphragm elements having a dead-ended input chamber connected to the summing points and having output chambers connected in series to a supply, said output chamber of the repeater having an exhaust orifice, the output chamber of the comparator having an output orifice, said comparator orifice being selectively open or closed and said control signal is a binary control signal.

14. The fluid control system of claim 13 having a temperature comparing section connected to control said pressure comparator, said temperature comparing section including a fluidic repeater connected directly to the one temperature detector and generating a related output signal, said temperature section having a pressure comparator having one input connected to the output of the temperature fluidic repeater and a second input connected to the output of the opposite temperature detector and generating a pressure output signal related to the relative pressure input signals, means connecting the output of the temperature pressure comparator to the output of the enthalpy comparator to generate a positive logic output with ] preselected temperature relationship independently of the enthalpy relationship of said first and second sources.

15. The fluid control system of claim 9 including a temperature comparing means yaving a first input means connected to the first temperature detector and second input means connected to the second temperature detector, said comparing means producing a fluid pressure signal in accordance with the two temperature inputs, and an output summing means connected to said comparing means and to the enthalpy comparator section to selectively disable the comparator section and establish said control signal in accordance with the temperature inputs.

16. The fluid control system of claim 15 wherein said enthalpy comparator section is disabled in response to an outside dew point temperature less than the temperature of the return air source.

17. A mechanical refrigeration system for controlling the supply of air to a mechanical refrigeration unit from a return air duct and an outside air duct comprising a return air temperature detector in said return air duct for detecting the temperature of the return air, an outside air temperature detector in in said outside air duct for detecting the temperature of the outside air, a return air humidity detector in said return air duct for detecting the humidity of the return air, an outside air humidity detector for detecting the humidity of the outside air, each of said detectors establishing a corresponding fluid signal, a first combining means having a first resistor connected to the return air temperature detector and to a first summing point and a second resistor connected to the return air humidity detector and to the summing point to produce a return air enthalpy signal, second combining means including third and fourth resistors connected to said outside air temperature detector and said outside air humidity detector and to a second summing point to generate a corresponding outside air enthalpy signal, a fluid comparator means including dead-ended input means connected one each to said summing points and having an output means generating a related control signal, and an air selection means including a fluid-driven input connected to said comparator means and connected to oppositely open and close said air ducts.

18. The mechanical refrigeration system of claim 17 having a temperature comparing section including a fluid temperature comparator means having dead-ended inputs connected to the temperature detectors and having an output means generating a temperature related fluid signal, and means connecting said output means of the first and second named fluid comparator means.

19. The mechanical refrigeration system of claim 18 wherein said first named comparator means includes a diaphragm fluid repeater with a dead-ended input chamber connected to one of said summing points and an output chamber, said first named comparator means includes a diaphragm comparator having a dead-ended input chamber connected to the other of said summing points and having an output chamber connected to said output chamber of the fluid repeater, said diaphragm comparator having an output orifice, an air selection connecting line connected to said output orifice and to said air selection means, said temperature comparator means including a diaphragm temperature fluid repeater with a dead-ended input chamber connected to one of said temperature detectors and having an output chamber having a supply and output port means and an exhaust orifice, said temperature comparator means includes a diaphragm temperature comparator having a dead-ended input chamber connected to the other of said temperature detectors and having an output chamber connected to the output chamber of the diaphragm temperature fluid repeater, said temperature comparator having an output orifice connected to said air selection connecting line, and a load resistor connected to said air selection connecting line.

* * * * *

UNITED STATES PATENT AND TRADEMARK OFFICE
CERTIFICATE OF CORRECTION

PATENT NO. : 3,913,344
DATED : October 21, 1975
INVENTOR(S) : THOMAS M. HOLLOWAY ET AL It is certified that error appears in the above-identified patent and that said Letters Patent are hereby corrected as shown below:

Column 6, Lines 15 & 16, after "illustrated" cancel "psypsychrometric" and substitute therefor ---psychrometric---;

Column 13, Line 27, before "point" insert ---summing---;
CLAIM 9

Column 14, Line 2, cancel "]" and substitute therefor ---a---;
CLAIM 14

Column 14, Line 6, cancel "yaving" and substitute therefor ---having---;
CLAIM 15

Column 14, Line 25, cancel "in" second occurrence.
CLAIM 17

Signed and Sealed this third Day of February 1976

[SEAL]

Attest:

RUTH C. MASON
Attesting Officer

C. MARSHALL DANN
Commissioner of Patents and Trademarks